United States Patent
Van Der Meer et al.

(10) Patent No.: US 11,486,464 B2
(45) Date of Patent: Nov. 1, 2022

(54) TRANSVERSE SEGMENT FOR A DRIVE BELT AND A DRIVE BELT FOR A CONTINUOUSLY VARIABLE TRANSMISSION INCLUDING THE TRANSVERSE SEGMENT AND A RING STACK

(71) Applicant: Robert Bosch GmbH, Stuttgart (DE)

(72) Inventors: Cornelis Johannes Maria Van Der Meer, Tilburg (NL); Maud Groener, Eindhoven (NL); Rob Petrus Maria Van Hoek, Gerwen (NL)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 17/114,999

(22) Filed: Dec. 8, 2020

(65) Prior Publication Data

US 2021/0172496 A1     Jun. 10, 2021

(30) Foreign Application Priority Data

Dec. 10, 2019 (NL) .................................. 1043501

(51) Int. Cl.
*F16G 5/16* (2006.01)
*B21D 53/14* (2006.01)

(52) U.S. Cl.
CPC ............. *F16G 5/166* (2013.01); *B21D 53/14* (2013.01)

(58) Field of Classification Search
CPC ........................................................ F16G 5/16
USPC ........................................................ 474/242
See application file for complete search history.

(56) References Cited

U.S. PATENT DOCUMENTS

| | | | | |
|---|---|---|---|---|
| 4,299,586 A | * | 11/1981 | Van der Hardt Aberson | ............... F16G 5/16 474/201 |
| 4,303,403 A | * | 12/1981 | Larners | ...................... F16G 5/16 474/201 |
| 4,493,679 A | * | 1/1985 | Miranti, Jr. | ............... F16G 5/16 474/201 |
| 4,826,473 A | * | 5/1989 | Miyawaki | ................. F16G 5/16 474/240 |

(Continued)

FOREIGN PATENT DOCUMENTS

| | | |
|---|---|---|
| JP | 2000179626 A | 6/2000 |
| JP | 2009216145 A | 9/2009 |

(Continued)

OTHER PUBLICATIONS

Dutch Patent Office Search Report and Written Opinion for Application No. NL1043501 dated Aug. 18, 2020 (8 pages).

*Primary Examiner* — Henry Y Liu
(74) *Attorney, Agent, or Firm* — Michael Best & Friedrich LLP

(57) ABSTRACT

Transverse segments (10) for a drive belt (6) for a belt-and-pulley-type continuously variable transmission include a row of these transverse segments (10) mounted on a stack (9) of several, mutually nested rings. The transverse segments (10) are provided with a protrusion (40) that protrudes from a front surface (11) thereof and with a corresponding cavity (41) that is provided in a back surface (12) thereof. An offset is provided between the protrusion (40) and the cavity (41) in the radial direction of the drive belt (6), such that in the row of transverse segments (10) in the drive belt (6) these will be inclined backwards by the forced insertion of the protrusion (40) into the cavity (41).

7 Claims, 3 Drawing Sheets

(56) References Cited

U.S. PATENT DOCUMENTS

| | | | | |
|---|---|---|---|---|
| 5,004,450 A * | 4/1991 | Ide | F16H 9/125 | 474/242 |
| 5,152,722 A * | 10/1992 | Yamada | F16G 5/16 | 474/240 |
| 5,169,369 A * | 12/1992 | Masuda | F16G 5/163 | 474/242 |
| 5,263,904 A * | 11/1993 | van Liempd | F16G 5/16 | 474/242 |
| 5,439,422 A * | 8/1995 | Smeets | F16G 5/16 | 474/242 |
| 5,533,940 A * | 7/1996 | Smeets | F16G 5/16 | 474/242 |
| 6,074,317 A * | 6/2000 | Kobayashi | F16G 5/16 | 474/201 |
| 6,110,065 A * | 8/2000 | Yagasaki | F16G 5/16 | 474/244 |
| 6,332,854 B1 * | 12/2001 | Kanokogi | F16G 5/16 | 474/201 |
| 6,334,830 B1 * | 1/2002 | Yagasaki | F16G 5/16 | 474/201 |
| 6,336,884 B1 * | 1/2002 | Wakui | F16G 5/16 | 474/201 |
| 6,342,020 B1 * | 1/2002 | Aoyama | F16G 5/16 | 474/201 |
| 6,440,025 B1 * | 8/2002 | Ohnuki | F16G 5/16 | 474/242 |
| 6,565,469 B1 * | 5/2003 | Aoyama | F16G 5/16 | 474/240 |
| 6,626,782 B1 * | 9/2003 | Ohsono | B21D 53/14 | 474/201 |
| 6,672,984 B2 * | 1/2004 | Yagasaki | F16G 5/16 | 474/201 |
| 6,755,760 B2 * | 6/2004 | Akagi | F16G 5/16 | 474/201 |
| 8,100,797 B2 * | 1/2012 | Prinsen | F16G 5/16 | 474/272 |
| 8,337,347 B2 * | 12/2012 | Kobayashi | F16G 5/16 | 474/201 |
| 2001/0018843 A1 * | 9/2001 | Suzuki | B21D 53/14 | 72/379.2 |
| 2001/0049314 A1 * | 12/2001 | Suzuki | F16G 5/16 | 474/248 |
| 2002/0025871 A1 * | 2/2002 | Fujioka | F16G 5/16 | 474/245 |
| 2002/0119855 A1 * | 8/2002 | Yagasaki | F16G 5/16 | 474/201 |
| 2002/0128103 A1 * | 9/2002 | Brandsma | F16G 5/16 | 474/201 |
| 2002/0138986 A1 * | 10/2002 | Wakui | B21D 53/14 | 474/242 |
| 2002/0187868 A1 * | 12/2002 | Liempd | F16G 5/16 | 474/242 |
| 2003/0004024 A1 * | 1/2003 | Van Dijnsen | F16G 5/16 | 474/201 |
| 2003/0162616 A1 * | 8/2003 | Miura | F16G 5/16 | 474/201 |
| 2004/0082417 A1 * | 4/2004 | Smeets | F16G 5/16 | 474/201 |
| 2004/0106485 A1 * | 6/2004 | Prinsen | F16G 5/16 | 474/201 |
| 2004/0152550 A1 * | 8/2004 | Van Der Meer | F16G 5/16 | 474/201 |
| 2004/0221569 A1 * | 11/2004 | Andreas Mutsaers | B21D 28/32 | 59/8 |
| 2006/0079366 A1 * | 4/2006 | Kanehara | F16G 5/16 | 474/201 |
| 2006/0183587 A1 * | 8/2006 | Kanehara | F16G 5/16 | 474/201 |
| 2007/0072721 A1 * | 3/2007 | Takagi | F16G 5/16 | 474/201 |
| 2007/0117663 A1 * | 5/2007 | Van Der Leest | F16H 55/56 | 474/201 |
| 2007/0161447 A1 * | 7/2007 | Shin | F16G 5/16 | 474/201 |
| 2008/0009378 A1 * | 1/2008 | Kanehara | F16G 5/16 | 474/242 |
| 2008/0305906 A1 * | 12/2008 | Kobayashi | F16G 5/16 | 474/242 |
| 2009/0054189 A1 * | 2/2009 | Tani | F16G 5/16 | 474/250 |
| 2009/0111633 A1 * | 4/2009 | Yagasaki | F16G 5/16 | 474/242 |
| 2009/0280940 A1 * | 11/2009 | Toyohara | F16G 5/16 | 474/242 |
| 2010/0016113 A1 * | 1/2010 | Kobayashi | F16G 5/16 | 29/283 |
| 2010/0029427 A1 * | 2/2010 | Van Der Meer | F16G 5/16 | 474/242 |
| 2010/0227719 A1 * | 9/2010 | Prinsen | B21K 23/00 | 474/148 |
| 2011/0300980 A1 * | 12/2011 | Kuwabara | F16G 5/16 | 474/242 |
| 2012/0036704 A1 * | 2/2012 | Okubo | B21D 28/06 | 29/557 |
| 2012/0190490 A1 * | 7/2012 | Morino | F16G 5/16 | 474/240 |
| 2012/0208663 A1 * | 8/2012 | Yamanaka | F16G 5/16 | 474/240 |
| 2012/0277048 A1 * | 11/2012 | Van Der Sluis | F16G 5/16 | 474/242 |
| 2012/0283059 A1 * | 11/2012 | Ando | F16G 5/16 | 474/248 |
| 2013/0040772 A1 * | 2/2013 | Ando | F16G 5/16 | 474/265 |
| 2013/0281240 A1 * | 10/2013 | Van Der Meer | F16G 5/16 | 474/244 |
| 2014/0106919 A1 * | 4/2014 | Harima | F16G 5/16 | 474/242 |
| 2014/0221141 A1 * | 8/2014 | Van Der Sluis | F16G 5/16 | 474/242 |
| 2014/0352387 A1 * | 12/2014 | Kakiuchi | F16G 5/16 | 72/330 |
| 2014/0371015 A1 * | 12/2014 | Van Der Sluis | F16G 5/16 | 474/240 |
| 2015/0045166 A1 * | 2/2015 | Van Der Sluis | F16G 5/16 | 474/201 |
| 2015/0276016 A1 * | 10/2015 | Yagasaki | F16G 5/16 | 474/148 |
| 2015/0285336 A1 * | 10/2015 | Ando | B21J 1/06 | 72/364 |
| 2015/0294446 A1 * | 10/2015 | Kanehara | G01M 13/02 | 348/125 |
| 2016/0053852 A1 * | 2/2016 | Yagasaki | F16G 5/16 | 474/272 |
| 2016/0102732 A1 * | 4/2016 | Yagasaki | F16G 5/16 | 474/242 |
| 2016/0281819 A1 * | 9/2016 | Yagasaki | F16G 5/16 | |
| 2017/0159752 A1 * | 6/2017 | Sumida | B21D 53/14 | |
| 2017/0184179 A1 * | 6/2017 | Prinsen | F16G 5/163 | |
| 2018/0023664 A1 * | 1/2018 | Bransma | F16G 5/16 | 474/8 |
| 2018/0128370 A1 * | 5/2018 | Yagasaki | F16H 9/04 | |
| 2018/0141101 A1 * | 5/2018 | Sumida | F16G 5/16 | |
| 2018/0311719 A1 * | 11/2018 | Yagasaki | B21D 35/001 | |
| 2019/0032749 A1 * | 1/2019 | Yagasaki | F16G 5/16 | |
| 2019/0032750 A1 * | 1/2019 | Brandsma | F16G 5/16 | |
| 2019/0101186 A1 * | 4/2019 | Ninomiya | F16G 5/16 | |
| 2019/0154113 A1 * | 5/2019 | Sato | F16G 5/00 | |
| 2019/0195315 A1 * | 6/2019 | Ochi | F16G 5/16 | |
| 2019/0234486 A1 * | 8/2019 | Inase | F16G 5/16 | |
| 2019/0301566 A1 * | 10/2019 | Yagasaki | B21D 22/02 | |

(56) References Cited

U.S. PATENT DOCUMENTS

2020/0132160 A1* 4/2020 Inase .................. F16G 5/16
2020/0149610 A1* 5/2020 Ochi .................. F16G 5/00

FOREIGN PATENT DOCUMENTS

| WO | 2015063132 A1 | 5/2015 |
| WO | 2018121884 A1 | 7/2018 |
| WO | 2018210456 A1 | 11/2018 |

* cited by examiner

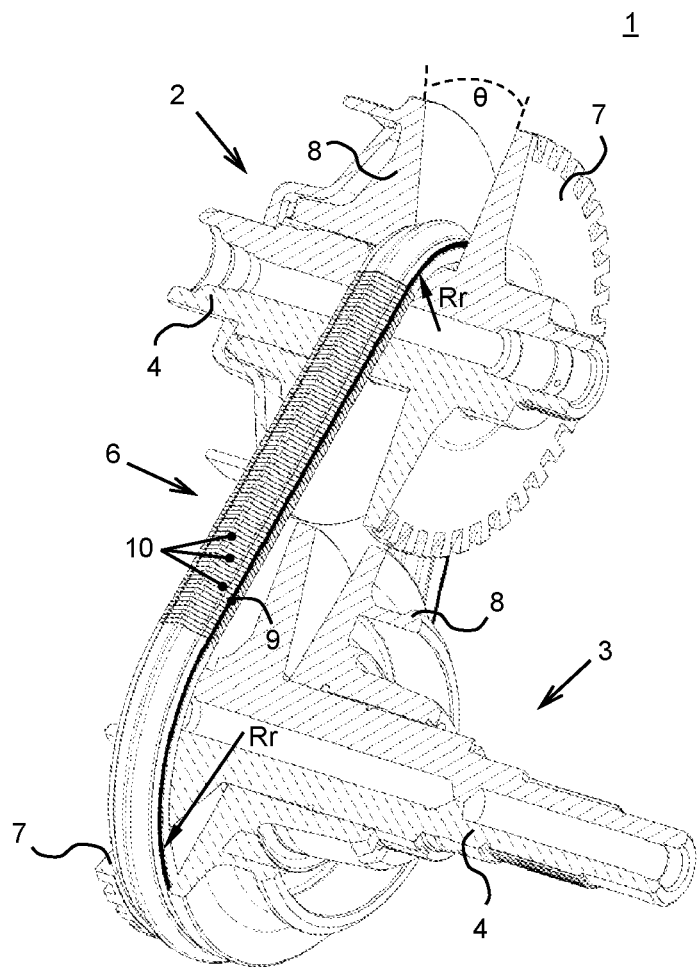
FIG. 1
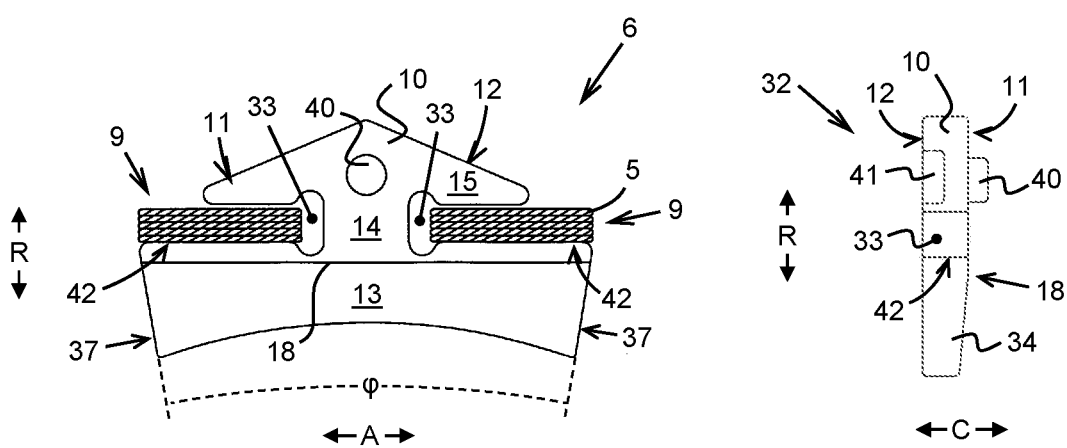 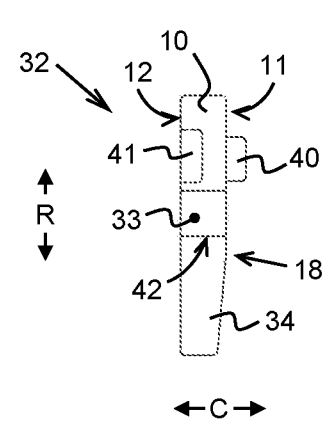
FIG. 2      FIG. 3

US 11,486,464 B2

TRANSVERSE SEGMENT FOR A DRIVE BELT AND A DRIVE BELT FOR A CONTINUOUSLY VARIABLE TRANSMISSION INCLUDING THE TRANSVERSE SEGMENT AND A RING STACK

BACKGROUND

This invention relates to a transverse segment that is destined to be part of a drive belt for a continuously variable transmission with two pulleys and the drive belt. Such a drive belt is known from the international patent application publication WO2015/063132-A1 and comprises a row of metal transverse segments mounted on a stack of several, mutually nested continuous metal bands, i.e. flat and thin rings, each. The transverse segments define a slot for accommodating and confining a respective circumference section of the ring stack, while allowing the transverse segments to move along the circumference of the ring stacks. This particular type of drive belt is also referred to as a push-type drive belt or pushbelt.

In the following description the axial, radial and circumference directions are defined relative to the drive belt when placed in a circular posture outside the transmission. Furthermore, a thickness dimension of the transverse segments is defined in the circumference direction of the drive belt, a height dimension of the transverse segment is defined in the said radial direction and a width dimension of the transverse segment is defined in the said axial direction.

The known transverse segments each comprise a base portion, a middle portion and a top portion. The middle portion of the transverse segments extends in radial direction interconnecting the said base and top portions thereof. Between the base portion and the top portion and on either side of their middle portion of the transverse segment a respective slot for accommodating a respective ring stack of the drive belt is defined. At each slot, a radially outward facing bottom surface thereof contacts and supports the ring stack in radial outward direction. These bottom surfaces of the slots that are associated with the base portion of the transverse segments are denoted bearing surfaces hereinafter.

In the row of transverse segments of the drive belt, at least a part of a front main body surface (facing in a direction of belt rotation) of the transverse segment abuts against at least a part of the back main body surface (facing backward relative to the belt rotation direction) of a respectively leading transverse segment in the said row, whereas at least a part of the back main body surface of the transverse segment abuts against at least a part of the front main body surface of a respectively trailing transverse segment. At least one of these front and back main body surfaces of the transverse segment, for example the front main body surface includes an axially extending, convexly curved surface part. This curved surface part divides the front main body surface into a radially outer and a radially inner surface parts that are oriented at an angle relative to one another. Abutting transverse segments in the drive belt are able to tilt relative to one another, while remaining in mutual contact at such curved surface part that is denoted tilting edge hereinafter, but that is also designated as rocking edge in the art. The tilting edge allows the row of the transverse segments of the drive belt to follow a local curving of the ring stacks imposed by the transmission pulleys.

The transverse segment is further provided with a protrusion, i.e. stud that projects from its front main body surface and with a cavity, i.e. hole that is recessed in its back main body surface. In the row of transverse segments of the drive belt, the protrusion of the said trailing transverse segment is at least partially located in the cavity of the said leading transverse segment, such that an individual displacement of the abutting transverse segments in a plane perpendicular to the circumference direction of the drive belt is prevented or, at least, limited to a play of the stud inside the cavity. Typically, the protrusion and the cavity are of a similar overall shape, e.g. predominantly cylindrical with a slight conicity, i.e. taper. However, since the protrusion is to be received in the cavity, it is sized somewhat smaller than the cavity, such that in the drive belt, a clearance exists between the outer circumference of the protrusion and the inner circumference of the cavity in every direction. In particular in case of the said predominantly cylindrical shape thereof, the height and diameter of the protrusion are less than the depth and the diameter of the cavity.

In relation to such clearance of the protrusion inside the cavity, JP2000-179626A teaches to set a smaller clearance at the underside of the protrusion than at the topside thereof in order to suppress wear. In particular in case of the said predominantly cylindrical shape thereof, such clearance setting is realised by positioning the protrusion somewhat lower on the transverse segment than the cavity, whereby a centreline of the protrusion is located radially inward of a centreline of the cavity.

For the sake of completeness is noted that alternative designs of the presently considered type of drive belt are known in art, such as from the international patent publication WO2018/210456-A1. This alternative drive belt design includes only a single ring stack located in a single, centrally located opening of each of the transverse segments. This central opening is open towards the radial outside of the drive belt and is thus defined by and between the base portion and two pillar portions of the transverse segment that respectively extend from a respective side of the base portion in radial outward direction. Also this type of transverse segment is typically provided with the above-described protrusion-and-cavity pair that is provided centrally in the base portion and/or in two instances, one in each pillar portion.

During operation of these known drive belts, and seen in the direction of rotation thereof in the transmission, a relatively leading transverse segment rotates relative to a trailing transverse segment as it traverse from a straight trajectory part of the drive belt located between the pulleys into a curved trajectory part thereof on the pulleys. In particular, in the said curved trajectory part the transverse segments are mutually oriented at a tilting angle α that is determined—or, at least, can be approximated—by a radius of curvature Rr of the curved trajectory part and a thickness t of the transverse segment as follows:

$$\alpha[\deg] = (180 \cdot t)/(\pi \cdot Rr) \qquad (1)$$

In such relatively rotated orientation thereof, two successive transverse segments can remain in mutual contact at the tilting edge of the trailing transverse segment. Because the tilting edge is defined by a convex curvature rather than an sharp-angled edge, it can be derived geometrically that, when the successive transverse segments rotate relative to each other, the leading transverse segment not only rolls-off over the tilting edge of the trailing transverse segment, but also slides in radial outward direction over such tilting edge. Although such radial sliding in theory causes some wear of the tilting edge as well as some belt-internal friction losses, these effects are, in practice, only minimal.

SUMMARY

According to the present invention, however, a further effect occurs as a result of such radial sliding that has previously gone unnoticed. Namely, underlying the present invention is the observation that by decreasing such radial sliding, the friction between the transverse segment and the pulley increases surprisingly also in the direction of rotation thereof, i.e. tangentially. This further effect is of course highly favourable in that it allows the transmission to either transmit a higher torque or operate at a reduced normal force between drive belt and pulleys.

According to the present invention, a favourable way to decrease the said radial sliding of the transverse segments is to mutually arrange these in a backwards inclined position in the straight trajectory part of the drive belt and relative to the ring stack thereof, by positioning the protrusion lower on the transverse segment to such an extent that the radially inner, i.e. bottom side of the protrusion is located radially inward of, i.e. below, the radially inner side of the cavity. By this measure, even when otherwise traveling in a straight line between the pulleys, the transverse segments are inclined backwards in the row thereof in the drive belt, because of the forced insertion of the protrusion into the (higher lying) cavity. Thus, the transverse segments enter the pulley in such backwards inclined orientation, whereby the said radial sliding thereof is favourably reduced and/or the friction thereof with the pulley in tangential direction is favourably increased.

Another effect of the said backwards inclination of the transverse segments is that a noise generated by the operation of the drive belt in the transmission, in particular by the transverse segments sequentially arriving in contact with the pulley, favourably decreased (by up to minus 10 dB). This unexpected, but highly advantageous side effect of the present invention, can be attributed to the circumstance that the backwards inclined transverse segments enter the pulley more gradual compared to transverse segments that are oriented essentially perpendicular to the ring stack, i.e. radially relative to the pulley when entering it, such that the initial contact there between is more instantaneous.

Specifically in case of the said predominantly cylindrical shape of the protrusion and the cavity and in accordance with the present invention, the centreline of the protrusion is located radially inward of a centreline of the cavity by an amount CLO that is larger than the radial clearance between the protrusion and the cavity. This radial clearance can be approximated by half the difference between the (inside) diameter Dh of the cavity and the (outside) diameter Dp the protrusion, such that the required centreline offset amount CLO is defined as follows:

$$CLO > 0.5 \cdot (Dh - Dp) \tag{2}$$

It is noted that, since the cavity and the protrusion are typically minimally tapered, i.e. are slightly cone shaped, the diameter Dh of the cavity and the diameter Dp the protrusion are compared at an equal distance perpendicular to the rear and the front main body surface of the transverse segment respectively.

By the centreline offset amount CLO according to equation (2), the transverse segments are inclined backwards relative to the radial direction when entering the curved trajectory part on the pulley at an inclination angle β that is determined—or, at least, can be approximated—as follows:

$$\beta = \arctan((CLO - 0.5 \cdot (Dh - Dp))/t) \tag{3}$$

In preferred embodiment of the present invention, an upper boundary and a lower boundary is defined for such inclination angle β, as follows:

$$(180 \cdot t)/(\pi \cdot Rmax) \leq \beta[deg] \leq (180 \cdot t)/(\pi \cdot Rmin) \tag{4}$$

with Rmin representing a smallest radius of the curved trajectory part of the drive belt occurring in the transmission and Rmax representing a largest radius thereof.

More preferably, however, the inclination angle β is equal to or smaller than half the upper boundary defined by equation (4). After all, an inclination angle halfway between the said upper and lower boundaries already minimises the average value of the said radial sliding. More preferably still, the inclination angle β is set equal to the lower boundary defined by equation (4) to minimise any unwanted side effects of the invention such as the forces acting on the protrusion for inclining the transverse segment backwards.

For example, for a typical drive belt with an Rr_max value of 77 mm and a t value of 1.5 mm, the present invention provides that the inclination angle β preferably has a value of 1 degree. In combination with a typical radial clearance between the protrusion and the cavity of 0.025 mm, equation (3) prescribes a centreline offset amount CLO of 0.050 mm. In this respect, practically applicable values for the centreline offset amount CLO lie in the range from 0.035 mm to 0.100 mm.

BRIEF DESCRIPTION OF THE DRAWINGS

The above-described invention and the technical working principles underlying the invention will now be explained further with reference to the drawing figures, whereof:

FIG. 1 provides a schematic perspective view of a continuously variable transmission with a drive belt running over two pulleys;

FIG. 2 provides a schematic cross-section of the known drive belt oriented in the circumference direction thereof;

FIG. 3 provides a schematic width-wise oriented view of a transverse segment of the known drive belt;

Figure 4:
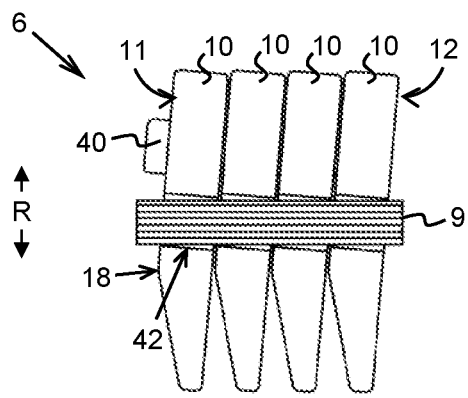
FIG. 4 schematically illustrates a straight trajectory part of a drive belt incorporating novel transverse segments designed in accordance with the present invention and illustrated in FIGS. 5 and 6.

Inter alia, it is noted that these drawing figures are of a schematic nature and, in particular, are not drawn to scale.

DETAILED DESCRIPTION

FIG. 1 schematically shows a continuously variable transmission, such as for utilization in a motor vehicle between the prime mover and the drive wheels thereof. The continuously variable transmission is indicated in general by the reference sign 1. The continuously variable transmission 1 comprises two pulleys 2, 3 and a drive belt 6 that is provided in a closed loop around the pulleys 2, 3. The pulleys 2, 3 are each provided with a pulley shaft 4 and with two pulley sheaves 7, 8, whereof a first pulley sheave 7 is fixed to the pulley shaft 4 of the respective pulley 2, 3 and whereof a second pulley sheave 8 is axially displaceable relative to such pulley shaft 4, while being fixed thereto in rotational direction. During operation of the transmission 1, the drive belt 6 is clamped at a running radius Rr at each pulley 2, 3 by and between the respective pulley sheaves 7, 8 thereof, which running radii Rr can be varied to vary the speed ratio of the transmission by moving the pulley sheaves 7, 8 of the pulleys 2, 3 towards, respectively away from each other.

The drive belt 6 comprises two sets of mutually radially stacked continuous bands or rings, denoted ring stacks 9 hereinafter. Transverse segments 10 of the drive belt 6 are arranged on the ring stacks 9 forming an essentially contiguous row along the entire circumference thereof. For the sake of simplicity, only some of these transverse segments 10 are shown in FIG. 1.

The transverse segments 10 are provided movable with respect to the ring stacks 9, at least along the circumference thereof. As a result, a torque can be transmitted between the transmission pulleys 2, 3 by means of friction and by the transverse segments 10 pressing against one another and pushing each other forward along the circumference of the ring stacks 9 in a direction of rotation of the pulleys 2, 3. The transverse segments 10 and the (rings of the) ring stacks 9 of the drive belt 6 are typically made of steel. This particular type of transmission 1 and its principal operation are well-known per se.

In FIG. 2, an exemplary embodiment of the drive belt 6 is shown in cross-section oriented in length or circumference direction C thereof, i.e. perpendicular to the width or axial direction A and the height or radial direction R of the drive belt 6. In FIG. 3, only the transverse segment 10 of FIG. 2 is shown in a side elevation in the axial direction A.

In FIG. 2, the ring stacks 9 are shown in cross-section and one transverse segment 10 of the drive belt 6 is shown in a front elevation. The ring stacks 9 are in this case composed of five individual flat, thin and flexible endless rings 5 each, which endless rings 5 are mutually concentrically stacked in the radial direction R to form the respective ring stack 9. In practice, however, these ring stacks 9 often comprise more than five endless rings 5, e.g. nine or twelve or possibly even more.

In FIGS. 2 and 3, the transverse segment 10 is shown to successively comprise in the radial direction R, a base portion 13 of predominantly trapezoidal shape, a relatively narrow middle portion 14 and a top portion 15 of predominantly triangular shape. On either side of the middle portion 14 slots 33 are defined between the base portion 13 and the top portion 15, wherein the ring stacks 9 are accommodated. At each slot 33, a radially outward facing bearing surface 42 of the base portion 13 contacts the radial inside of a respective ring stack 9 during operation.

A front main body surface of the transverse segment 10 is indicated in general by the reference sign 11, whereas a back main body surface of the transverse segment 10 is indicated in general by the reference sign 12. In the drive belt 6, at least a part of the front main body surface 11 of the transverse segment 10 abuts against at least a part of the back main body surface 12 of a respectively leading transverse segment 10, whereas at least a part of the back main body surface 12 of the transverse segment 10 abuts against at least a part of the front main body surface 11 of a respectively trailing transverse segment 10.

The transverse segment 10 takes-up a clamping force exerted between the sheaves 7, 8 of each pulley 2, 3 via contact faces 37 thereof, one such contact face 37 being provided at each axial side of the transverse segment 10. These contact faces 37 are mutually diverging in radial outward direction such that an acute angle is defined there between that is denoted the belt angle φ and that closely matches a pulley angle θ defined between the pulley sheaves 7, 8 of the pulleys 2, 3.

The transverse segment 10 is provided with a protrusion 40 that protrudes from its front surface 11 and with a corresponding cavity 41 that is provided in its back surface 12. In the drive belt 6, the protrusion 40 of the trailing transverse segment 10 is at least partially located in the cavity 41 of the leading transverse segment 10, such that a relative displacement between these successive transverse segments 10 in a plane perpendicular to the circumference direction C of the drive belt 6 is prevented or, at least, limited. In the accompanying figures the protrusion 40 and the cavity 41 are depicted with a cylindrical shape, however differently shaped protrusions 40 and cavities 41 are known as well. In particular, it is customary in the art to provide these with a slight conicity, i.e. taper. In any case, a nominal clearance of between 10 and 30 microns is typically provided between an outer circumference of the protrusion 40 and an inner circumference of the cavity 41 (i.e. symmetrically in all directions).

At the front surface 11 of the transverse segment 10, a tilting edge 18 is defined. The tilting edge 18 is represented by a convexly curved area of the front surface 11, which area separates two sections of the said front surface 11 in the radial direction R, which two sections are oriented at an angle relative to one another such that below, i.e. radial inward of the tilting edge 18 the transverse segment 10 is tapered. An important function of the tilting edge 18 is to provide the mutual pushing contact between the successive transverse segments 10 when these are in a slightly rotated, i.e. tilted position relative to one another at the pulleys 2, 3. In the design embodiment of FIG. 2, the tilting edge 18 is located in the base portion 13 of the transverse segment 10, but it is also known to locate the tilting edge 18 at least partly in the middle portion 14 of the transverse segment 10 (see FIG. 9).

An important function of the tilting edge 18 is to provide the mutual pushing contact between abutting transverse segments 10 in the row of the drive belt 6 when these are in a slightly rotated, i.e. tilted position relative to one another at the pulleys 2, 3. In particular, when a leading transverse segment 10 of a pair of successive transverse segments 10 enters between the two pulley sheaves 7, 8 of a pulley 2, 3, it is rotated relative to the trailing transverse segment 10 of the said pair that has not yet entered the pulley 2, 3, while its back surface 12 remains in contact at the tilting edge 18 on the front surface 11 of the trailing transverse segment 10. Because the radius of curvature of the tilting edge 18 of the trailing transverse segment 10 is non-zero, an axially oriented line of contact between the successive transverse segment 10 is displaced in radial inward direction, as the successive transverse segments 10 increasingly rotate relative to one another. Since the tilting edge 18 of the trailing transverse segment 10 is convexly curved and the back surface 12 of the leading transverse segment 10 is planar, such radial inward displacement is not the same for these transverse segments 10. Thus, in order for the successive transverse segments 10 to remain aligned in radial direction R, a sliding occurs there between when these transverse segments 10 rotate relative to one another. Although such sliding motion is only minimal, a noticeable favourable effect on the performance of the transmission was observed after it was reduced in accordance with the present invention (see FIG. 8).

Figure 5:
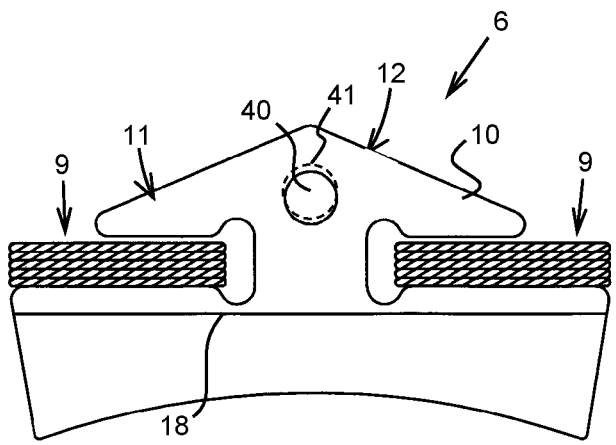
FIG. 5 is a front view of the novel transverse segment in accordance with the present invention in a schematic cross-section of a drive belt oriented in the circumference direction thereof.

According to the invention, the said sliding motion can be favourably reduced by placing the transverse segments 10 in a backwards inclined position, such as is illustrated in FIG. 4 in a straight section, i.e. trajectory part of the drive belt 6. Hereto, the protrusion 40 of the transverse segments 10 is positioned lower on, i.e. radial inward of the cavity 41 of thereof, to such an extent that the radially inner, i.e. bottom side of the protrusion 40 is located radially inward of, i.e. below, the radially inner side of the cavity 41, which novel transverse segment design is illustrated in FIG. 5. In this case, when the protrusion 40 of a respectively trailing transverse segment 10 is forcedly inserted into the (higher lying) cavity 41 of a respectively leading transverse segment 10, as they are pressed together in the row of transverse segments 10 of the drive belt 6, these transverse segment 10 are forced to tilt backward relative to the circumference direction C, i.e. relative to the ring stacks 9.

Figure 6:
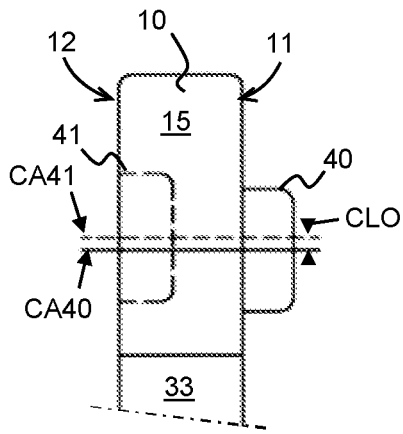
FIG. 6 is an enlargement of a detail of the novel transverse segment depicted in FIG. 5.

Further according to the invention and specifically in case of the illustrated cylindrical shape thereof, an offset CLO can thereto be applied between a centreline CA40 of the protrusion 40 relative to a centreline CA41 of the cavity 41 in radial inward direction, as illustrated in detail in FIG. 6, which offset CLO exceeds a value of half a difference between the diameters of the cavity 41 and the protrusion 40, i.e. exceeds the said nominal clearance there between.

Figure 7:
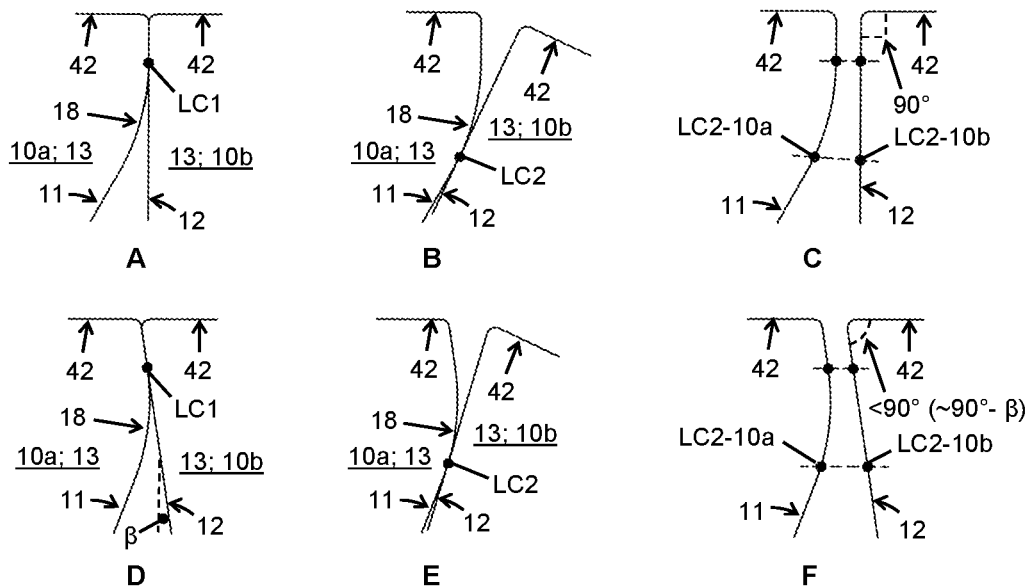
FIG. 7 schematically illustrates the working principle underlying the present invention.

In FIG. 7 the effect of the backwards inclination of the transverse segments 10, i.e. the working principle underlying the present invention, is graphically illustrated. Pictures A-F of FIG. 7 each represent the front surface 11 with a tilting edge 18 at the location of the base portion 13 with the bearing surface 42 of a respectively trailing transverse segment 10a and the back surface 12 at the location of the base portion 13 with the bearing surface 42 of a respectively leading transverse segment 10b. Pictures A, B and C that constitute the top row of FIG. 7 illustrate the conventional transverse segments 10, in particular the contact between two successive transverse segments 10a, 10b. In picture A, the successive transverse segments 10a, 10b are depicted mutually aligned in parallel, essentially perpendicular to the circumference direction C of the drive belt 6 in the straight trajectory parts thereof. perpendicular arrangement, the successive transverse segments 10a, 10b are in mutual contact through at least a first axially oriented line of contact LC1 at an upper end of the tilting edge 18 of the trailing transverse segment 10a. In picture B, the successive transverse segments 10a, 10b are depicted mutually tilted in the curved trajectory parts of the drive belt 6 at the pulleys 2, 3. In this tilted arrangement, the successive transverse segments 10a, 10b are in mutual contact through a second axially oriented line of contact LC2 within the extend of the tilting edge 18 of the trailing transverse segment 10a, i.e. radially inward of the first axially oriented line of contact LC1.

The tilting between the successive transverse segments 10a, 10b illustrated in pictures A and B of FIG. 7 can, however, not be a pure rolling-off of the (flat) back surface 12 of the leading transverse segment 10b over the (convexly curved) tilting edge 18 of the trailing transverse segment 10a, but must be accompanied by a sliding motion. Otherwise, i.e. in case of a pure rolling-off motion and as illustrated in picture C, the bearing surface 42 of the leading transverse segment 10b would be located further radially away from the second contact line LC2-10b than of the trailing transverse segment 10a (LC2-10a), which is not allowed by the pulleys 2, 3, whereof the sheaves 7, 8 impose a common radial position on the transverse segments 10 in a respective curved trajectory part of the drive belt 6.

However, according to the present invention it is possible and preferable to reduce the said sliding motion, by equalizing the radial inward displacement of the contact line between the successive transverse segments 10a, 10b. Pictures D, E and F that constitute the bottom row of FIG. 7 illustrate the novel transverse segments 10 that accomplishes this equalizing.

In picture D, two successive, novel transverse segments 10a, 10b are depicted mutually aligned in parallel in the straight trajectory parts of the drive belt 6 with the first contact line LC1 there between. In contrast with the known drive belt 6, these novel transverse segments 10a, 10b are inclined backwards relative to the circumference direction C of the drive belt 6 at an inclination angle β. In picture E, these novel transverse segments 10a, 10b are depicted mutually tilted in the curved trajectory parts of the drive belt 6 at the pulleys 2, 3 with the second contact line LC2 there between. As illustrated in picture F, the bearing surfaces 42 of these novel transverse segments 10a, 10b are located at corresponding radial distances from the said second contact line LC2, such that favourably no, or at least no net sliding motion is required there between. In particular, by the backwards inclination of the novel transverse segments 10, a radial distance between the first and second contract lines LC1, LC2 on the tilting edge 18 has been increased, whereas such radial distance on the back surface 12 has been decreased.

Also in FIG. 7, in particular in picture F thereof, a further feature of the transverse segment 10 according to the present invention is illustrated. Namely, the bearing surface 42 of the novel transverse segment 10 is preferably oriented at an angle smaller than 90 degrees relative to the back surface 12 thereof. In this manner, it is at least partly compensated for the backwards inclination of the transverse segment 10 in the straight trajectory parts of the drive belt 6, such that a preferred orientation of the bearing surface 42 parallel to the ring stack 9 is approached. Preferably in this respect, the bearing surface 42 is oriented at 90 degrees minus the said inclination angle β.

Figure 8:
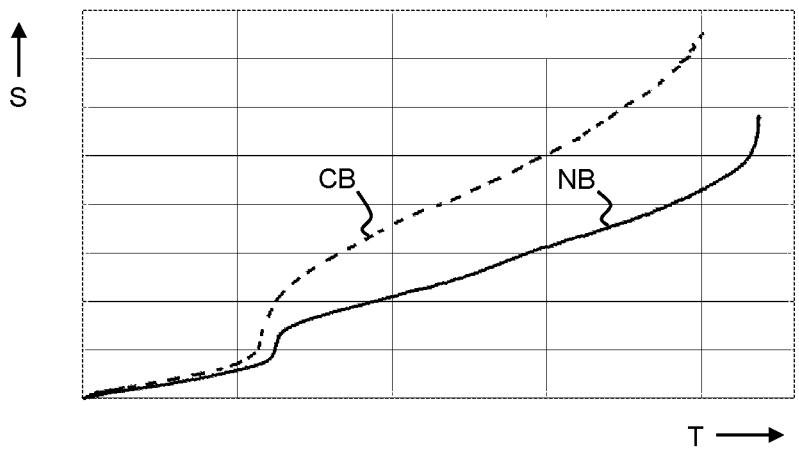
FIG. 8 is a graph illustrating a beneficial technical effect brought about by the present invention vis-à-vis the known art.

In FIG. 8 a beneficial technical effect brought about by the present invention vis-à-vis the known art is illustrated. FIG. 8 is a graph wherein a parameter S that is inversely proportional to the efficiency with which the drive belt 6 can transmit a torque T between the pulleys 2, 3 is plotted against the amount of torque T transmitted. The dashed line CB in FIG. 8 represents a measurement result obtained with a conventional drive belt 6 and the solid line NB represents a measurement result obtained with the novel drive belt 6 according to the present invention. FIG. 8 visualizes that the novel drive belt 6 performs better over essentially the whole torque T range, with an efficiency benefit that increases with torque T. Further, in FIG. 8 it is observed that the novel drive belt 6 can transmit a somewhat higher maximum torque T than the conventional drive belt 6 can.

Figure 9:
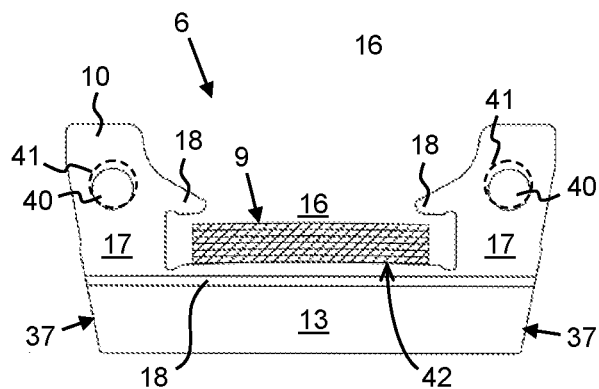
FIG. 9 illustrates the present invention when implemented in a basic design of the drive belt, alternative to that of FIG. 5.

It is noted that the present invention is not limited to the basic design of the transverse segment 10 illustrated in the FIGS. 1 to 6 with two ring stacks 9 located on either side of the middle portion 14. Rather the invention is applicable to any type of drive belt 6 composed of transverse segments 10 that are individually and movably mounted on at least one ring stack 9. In this respect, FIG. 9 illustrates a different type of drive belt 6 that includes only one ring stack 9 in cross-section. In this case, the transverse segments 10 are provided with a single, central cut-out 16 that is located between two pillar portions 17 of the transverse segments 10 that extend from either axial side of the base portion 13 thereof in radial outward direction. Each such pillar portion 17 includes a hook part 18, projecting over the central opening 5 for confining the ring stack 9 in the central cut-out 16. Moreover, each pillar portion 17 is provided with the protrusion 40 and the concavity 41, whereof in each case the protrusion 40 is located lower on the respective pillar portion 17 to such an extent that the bottom edge of the protrusion 40 is located below the bottom edge of the cavity 41 in accordance with the present invention.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof that lie within reach of the person skilled in the relevant art.

The invention claimed is:

1. A transverse segment (10) for a drive belt (6) provided with a ring stack (9) consisting of a number of mutually nested bands and with a number of such transverse segments (10) that are movably arranged in a row on the ring stack (9), which transverse segment (10) defines a slot (33) for accommodating the ring stack (9), which slot (33) is bounded, in radial inward direction, by a bearing surface (42) of a base portion (13) of the transverse segment (10) for supporting the radial inside of the ring stack (9), which transverse segment (10) further comprises a part (15; 17) that is located radial outward of the ring stack (9) when incorporated in the drive belt (6), in which part (15; 17) a protrusion (40) is provided on a front surface (11) of the transverse segment (10) and a cavity (41) in an oppositely located back surface (12) thereof, characterized in that the protrusion (40) is positioned on the front surface (11) radially inward relative to the position of the cavity (41) in the back surface (12) with a radially inner side of the protrusion (40) being located radially inward relative to a radially inner side of the cavity (41).

2. The transverse segment (10) according to claim 1, characterised in that the protrusion (40) and the cavity (41) thereof are provided with a predominantly cylindrical shape, with an outer diameter of the protrusion (40) being smaller than an inner diameter of the cavity (41), and in that a centerline (CA40) of the protrusion (40) is located radially inward of a centerline (CA41) of the cavity (41) with a mutual distance in radial direction there between that is larger than half the difference in diameter between the protrusion (40) and the cavity (41).

3. The transverse segment (10) according to claim 2, characterised in that the distance in radial direction has a value in the range from 0.035 mm tot 0.100 mm.

4. The transverse segment (10) according to claim 1, characterised in that the transverse segment (10) is provided with a tilting edge (18) in the form of an area of the front surface (11) thereof that is convexly curved in the radial direction and that extends perpendicular to the radial direction along the width of the transverse segment (10).

5. The transverse segment (10) according to claim 1, characterised in that an angle between the bearing surface (42) and the back surface (12) thereof is smaller than 90 degrees.

6. A drive belt (6) provided with a ring stack (9) including a number of mutually nested bands and with the transverse segment (10) according to claim 1 that is movably arranged in a row of transverse segments (10) on the ring stack (9) and whereof the projection (40) is located in the cavity (41) of a respectively adjacent transverse segment (10) in the row of transverse segments (10), characterized in that, at least in a straightened section of the drive belt (6), the transverse segment (10) is inclined backwards relative to the ring stack (9), whereby an angle ($\beta$) between the back surface (12) of the transverse segment (10) and the ring stack (9) is less than 90 degrees.

7. The drive belt (6) according to claim 6, characterised in that an angle between the bearing surface (42) and the back surface (12) of the transverse segment (10) amounts to 90 degrees minus the angle ($\beta$) at which the transverse segment is inclined backwards relative to the ring stack (9).

* * * * *